United States Patent [19]
Canay

[11] 4,028,574
[45] June 7, 1977

[54] SYNCHRONOUS MOTOR STRUCTURE INCORPORATING ROTOR HAVING SOLID POLES

[75] Inventor: Muzaffer Canay, Birr, Switzerland

[73] Assignee: BBC Brown Boveri & Company Limited, Baden, Switzerland

[22] Filed: Mar. 20, 1975

[21] Appl. No.: 560,529

[30] Foreign Application Priority Data

Apr. 1, 1974 Switzerland .................. 4497/74

[52] U.S. Cl. ................... 310/269; 310/162; 310/183

[51] Int. Cl.² .......................... H02K 1/24

[58] Field of Search ............ 310/263, 218, 65, 46, 310/162–164, 261, 203–208, 264, 269, 183, 192, 197, 216, 182, 187, 188, 189, 185, 166; 336/73, 75, 77

[56] References Cited

UNITED STATES PATENTS

| | | | |
|---|---|---|---|
| 1,369,765 | 3/1921 | Alexander | 310/218 |
| 2,303,481 | 12/1942 | Liwschitz | 310/183 |
| 2,411,002 | 11/1946 | Rudenberg | 310/183 |
| 2,449,506 | 9/1948 | Pollard | 310/269 |
| 2,736,829 | 2/1956 | Sills | 310/218 |
| 3,127,532 | 3/1964 | Gynt | 310/218 |
| 3,612,930 | 10/1971 | Raby | 310/218 |
| 3,740,600 | 6/1973 | Turley | 310/269 |

Primary Examiner—R. Skudy
Attorney, Agent, or Firm—Pierce, Scheffler & Parker

[57] ABSTRACT

A synchronous motor incorporates a rotor structure having solid poles. In order to improve the starting characteristic of the motor and protect the pole claws against burning, conductive bars are arranged at each side of the pole below the pole shoe and are electrically connected with the pole to form a quadrature-winding which provides a conductive path for currents induced at the pole surfaces by the time-variable quadrature-field and causes such currents to close around the quadrature-field thereby eliminating current from pole-to-pole by way of the claws. The quadrature-winding also forms a circuit parallel to the solid pole surfaces which thereby improves the asynchronous torque characteristics at low slip rates and reduces the oscillating torque.

8 Claims, 13 Drawing Figures

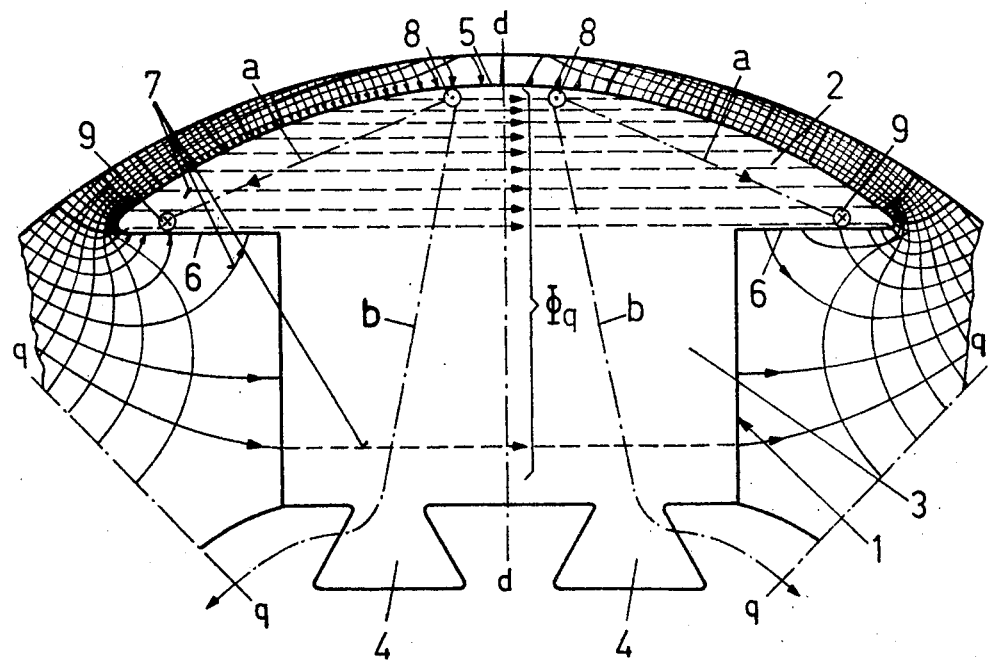
PRIOR ART FIG.1
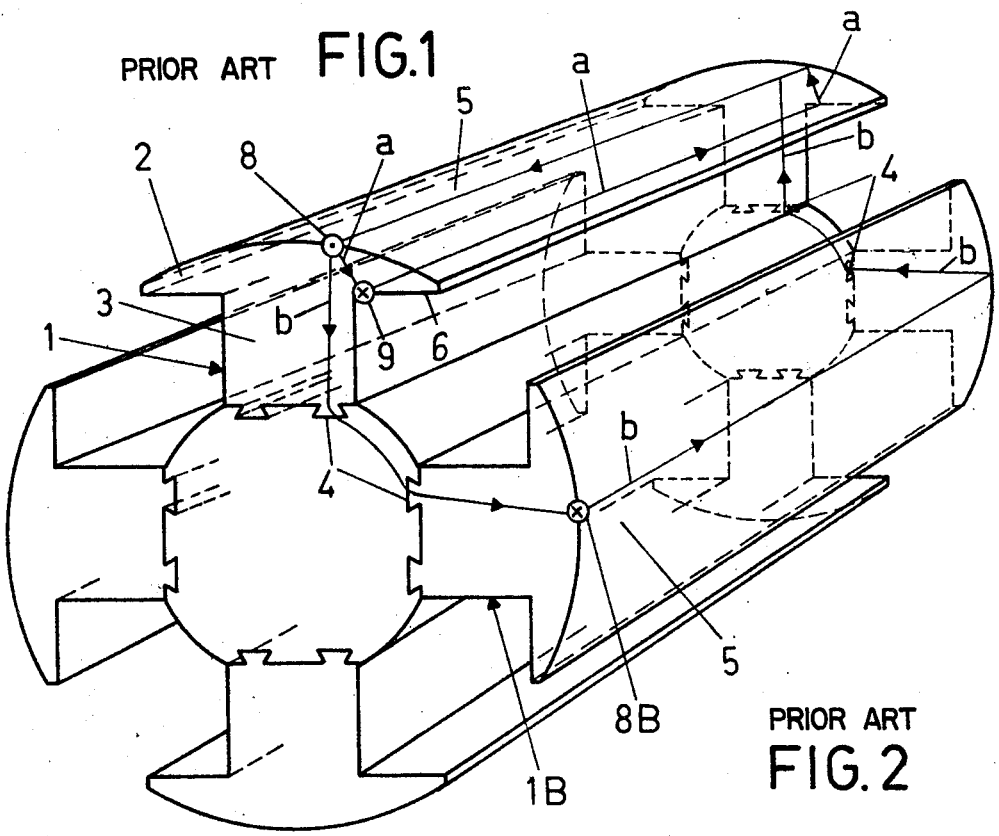
PRIOR ART FIG.2

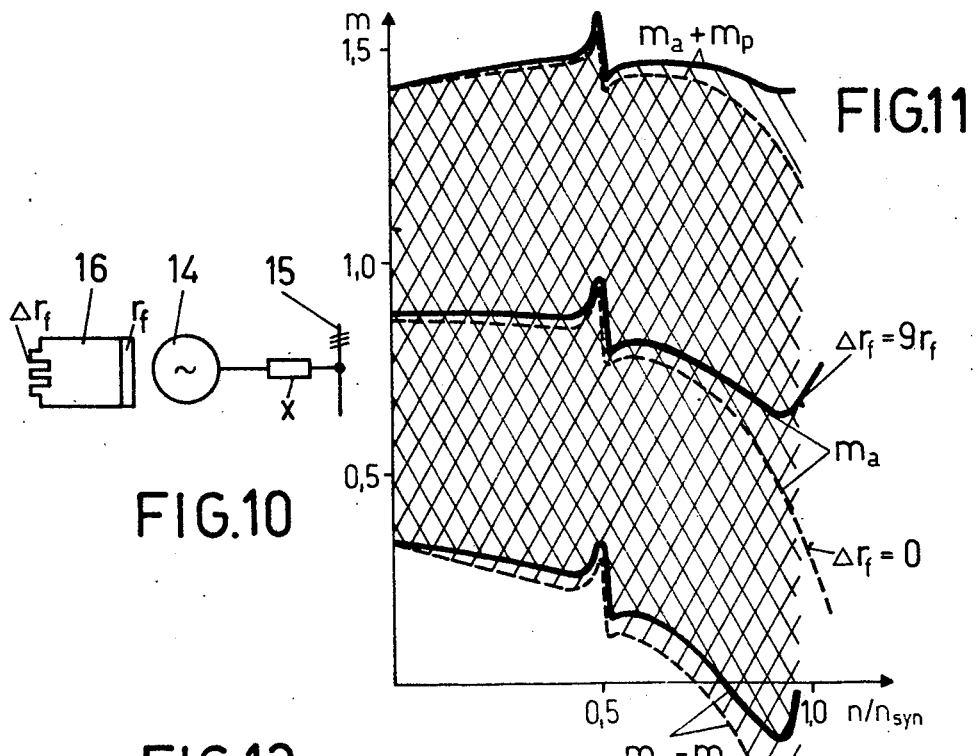
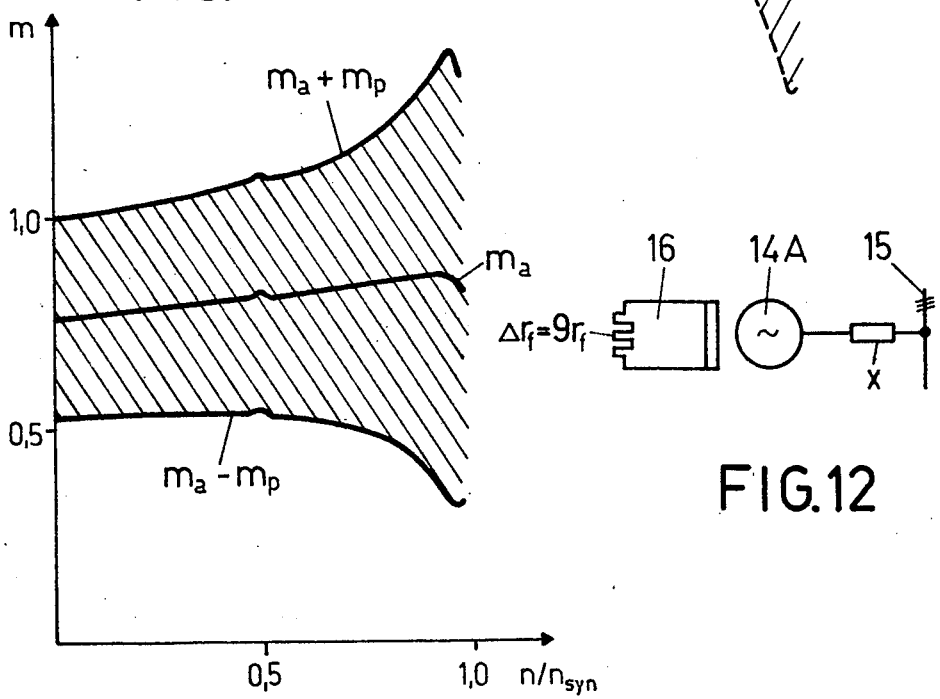

SYNCHRONOUS MOTOR STRUCTURE INCORPORATING ROTOR HAVING SOLID POLES

This invention relates to an improvement in the construction of synchronous motors, and has particular reference to one in which the motor component has solid poles, in order to protect the pole claws against burning, and to improve the starting properties of such motors, and in particular to improve the characteristics of the asynchronous torque to reduce the oscillating torque.

Synchronous motors with rotors having solid poles are known. Such motors are advantageous because they will absorb the rotor heat generated during their starting process. Large amounts of energy in the form of heat are absorbed by the rotor surfaces throughout the starting process. Such motors will further generate a high starting torque due to the low conductivity of the pole iron.

However, the asynchronous torque will in certain cases be insufficient as the time when the synchronous speed has almost been reached. It is for this reason that the use of such motors is not possible under many operating conditions, for example the re-synchronization under load after a supply failure.

Furthermore, synchronous motors which run asynchronously during the starting-up period will generate not only an asynchronous torque but also an undesirable oscillating torque of considerable amplitude, with the result that the total torque will pulsate at double slip frequency about the asynchronous torque value (see "Anlaufverfahren bei Synchronmaschinen, Brown, Boveri Mitteilungen" Volume 54, No. 9, Pages 618 and 619). Such oscillating torque, caused primarily by the electric anisttropy of the rotor, subjects the shaft of the motor, the couplings and any other shafts connected thereto to additional stresses which can endanger the unit under certain circumstances.

Furthermore, the effect of "claw burning" needs to be taken into consideration when designing the solid poles without pole connections. The currents, induced at the pole surfaces by the time-variable quadrature-field, will flow along the path of lowest resistance, often from one pole to the other, by way of the claws, causing a burning of the claws (see "Anlauf und Laufruhe schnellaufender Pumpengruppen" by K. Abegg, Bulletin SEV 56, 1965, 10, May 15).

Therefore, solid poles have the following disadvantages: a. unfavorable torque characteristic close to the synchronous speed,
b. large oscillating torque,
c. danger of claw burning.

Heretofore, these disadvantages have been overcome to some degree by the placement of damping rings on both sides or by pole connections. However, the placement of damping rings meets with various difficulties concerning the design as well as operations among which are:
a. heat expansions, requiring the use of elastic connections from pole to pole,
b. deterioration of the cooling due to the partial covering of the pole gaps,
c. difficulties encountered during the disassembly of the poles.

It is the principal object of the invention to avoid the disadvantages of the known arrangements and to provide an improved rotor structure for a synchronous motor with solid poles which will improve the starting characteristics of these motors and also protect their pole claws against burning, which is simple and economic in design, a design which will insure safe and reliable operations.

The problem is solved by the invention which is principally characterized by at least one conductor each, arranged at both sides of the rotor poles below the pole shoe and connected electrically with the pole in such manner that it will serve as a conductive path fo the currents induced at the pole surfaces by the time-variable quadrature-field, and will cause a closing of the currents, mentioned above, around the quadrature-field.

The improved pole structure proposed by the invention provides a protective and starting-up winding which is primarily effective within the quadrature axis without requiring any connection from pole to pole. This "quadrature-winding" offers a better path for the currents induced at the pole surfaces during the starting process, thus closing the circuits around the quadrature-field, thereby eliminating the current flow from pole-to-pole by way of the claws. The quadrature-winding also forms a circuit which is parallel to the solid pole surfaces and improves thereby the characteristics of the asynchronous torque at low slip rates, and reduces the oscillating torque, while not impairing the advantages of the solid poles in the case of high slip rates. Several species of the invention are discussed below in detail, based on the accompanying drawings wherein:

FIG. 1 is a front view of a standard solid pole, including poleshoe, pole shank, claws and flux lines of the quadrature-field.

FIG. 2 is a perspective view of a standard rotor with four solid poles in accordance with FIG. 1, indicating the routes $a$ and $b$ which can be followed by the currents;

FIG. 10 shows a schematic sketch of a circuit arrangement for the start of a standard synchronous motor;

FIG. 11 illustrates in the form of curves the behavior of the asynchronous torque $m_a$ and of the oscillating torque $m_p$ in the case of a standard synchronous motor with solid poles without a quadrature-winding during its starting-up run carried out by means of the circuit arrangement shown by FIG. 10;

Figure 8:
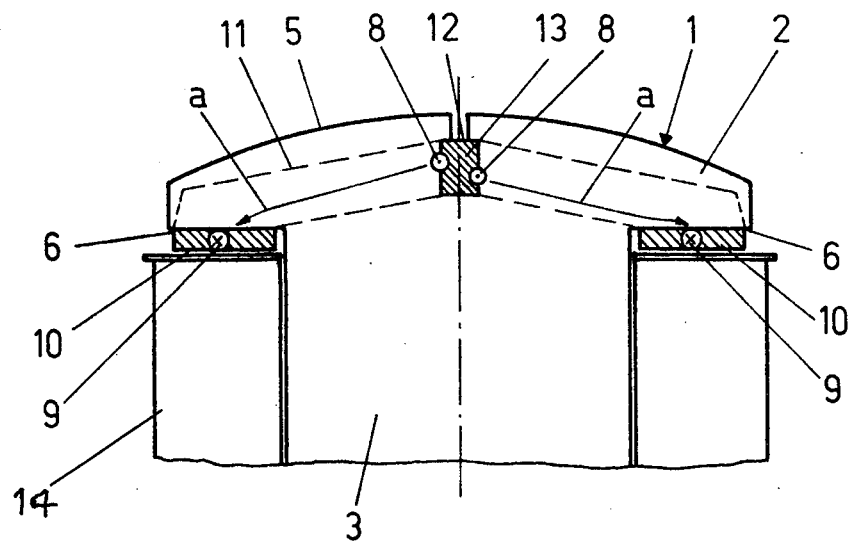
FIG. 8 shows a species similar to the species depicted by FIG. 3, whereby the pole shoe is provided at its center with an additional conductor rod of rectangular profile which extends axially and possesses good conductivity.
Figure 9:
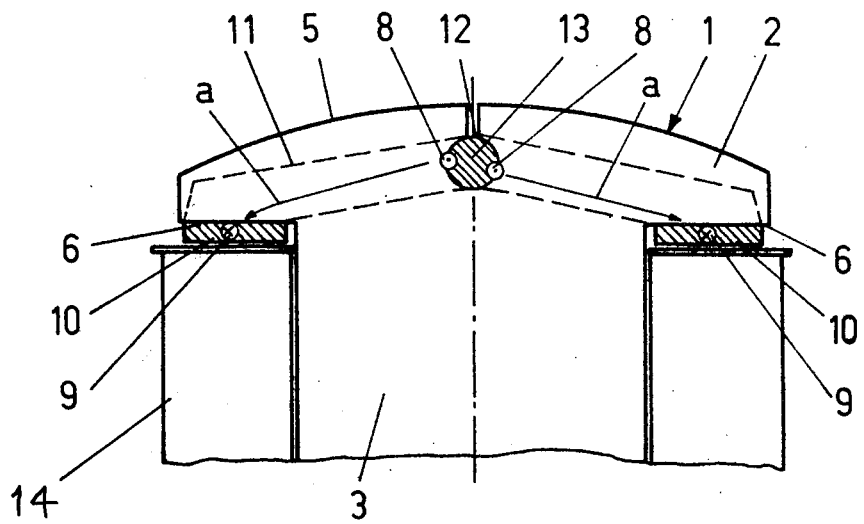
FIG. 9 shows a species similar to the species depicted by FIG. 8 where the additional conductor rod of good conductivity has a circular profile.

FIG. 12 shows a circuit arrangement for the starting-up run of a synchronous motor with solid poles which is provided with the quadrature-winding proposed by the invention; and FIG. 13 illustrates in the form of curves the behavior of the asynchronous torque $m_a$ and of the oscillating torque $m_p$ in the case of a synchronous motor with solid poles which is provided with the quadrature-winding proposed by the invention either in the form shown by FIG. 8, or in the form shown by FIG. 9 during the starting-up run carried out by means of the circuit arrangement of FIG. 12.

With reference now the drawings, FIG. 1 shows a rotor pole 1 of known construction with the pole shoe 2, the pole shank 3, the pole claws 4 for securing the pole onto the central body portion of the rotor and the lines of flux 7 of the quadrature-field $\Phi_q$ (exciting field without rotor reaction). The figure shows that the main portion of the field will stay within the pole shoe 2. When the quadrature-field $\Phi_q$ varies timewise, currents are induced at the pole shoe surface 5 which will close around the field. These currents follow the path of least resistance and can take either course $a$ or course $b$ as can be seen partially in FIG. 1 and more clearly in FIG. 2. In these figures the numeral 8 symbolizes a current direction coming out of the drawing plane, and numeral 9 a current direction going into the drawing plane.

If path $a$ is the path of least resistance, the current flows at point 8 from pole shoe 2 and proceeds along the front face of pole shoe 2 to the pole shoe edge 6. At point 9 the current flows axially under the pole shoe edge 6 to the rear face of pole shoe 2, then along the rear face of the pole shoe 2 to the pole shoe surface 5, and finally axially along the pole shoe surface 5, thus returning to the front at starting point 8, thereby completing the circuit.

If, on the other hand, path $b$ is the path of least resistance, the current flows at point 8 from the pole shoe 2 and proceeds along the front face of pole 1 in direction of claw 4. From here the current flows to claw 4 of the adjacent pole 1B, see FIG. 2, and along the front face to pole shoe surface 5. At point 8B the current flows axially along the pole shoe surface 5 to the rear face of pole 1B, then along this surface to the claw 4 of this pole 1B, from here over to claw 4 of pole 1, then along the rear face of pole 1 to its pole shoe surface 5, and finally axially along this pole shoe surface, thus returning to the front at point 8, thereby completing this circuit.

If the current follows path $b$, in other words, if path $b$ offers a much lower resistance by way of pole shanks 3 and claws 4 than the path $a$, a heavy current can flow from one pole 1 to the other pole 1B by way of the claws and thereby cause burnings.

FIGS. 3 to 9 show various species of the improved construction in accordance with the invention which eliminates the danger of such burning by making the path $a$ the path of lower resistance by means of a quadrature-winding.

In the case of the arrangement shown by FIG. 3 the quadrature-winding consists of two rods 10, possessing good conductivity, each placed in the longitudinal direction of pole 1 below one pole shoe edge 6 and connected electrically with the pole shoe 2. The quadrature-field currents, induced at the pole surfaces 5, are returned in the axial direction of the rotor below the pole shoe edges 6 by way of these rods 10 which can be connected mechanically and electrically with the faces of the pole shoe 2 by welding, hard-soldering or pressure force contact through extensions 11, thereby allowing the currents to close the circuit around the quadrature-field. The rods 10 are placed under the pole shoe edges 6 without any insulation directly at the iron of the pole shoe 2. The currents will now take the path $a$ because, due to the presence of the rod 10, being of good conductivity, this path will be the path of lower resistance. The rods 10 take the place of pole connections or of damper rings respectively and will protect the claws. In the case of this species, i.e., FIG. 3, the damping circuit of the quadrature-axis $q$ - $q$ (FIG. 1) actually comprises two parts connected in series, namely, the pole surface 5 made of iron and acting as a first conductor and the return path by way of the rods 10, arranged under the pole shoe edges 6 and possessing good conductivity, acting as a second conductor. The starting-up energy within the quadrature-axis $q$ - $q$ is thus again transformed into heat at the pole surface 5 by the high eddy-current resistance of the iron. It is for this reason that the starting-up characteristics of a synchronous machine provided with this arrangement are practically identical to the characteristics of a synchronous machine provided with damper rings. However, the arrangement proposed by the invention has the advantage that the rings which will impede the admission of air are eliminated, and that the poles, in the case of disassembly, can be removed and replaced separately. In the case of this design it becomes therefore possible to fasten the rods 10 by way of extensions 11 at the face of the pole shoes 2, for example, by hard-soldering, without hindering thereby the individual removal of the poles.

Figure 3:
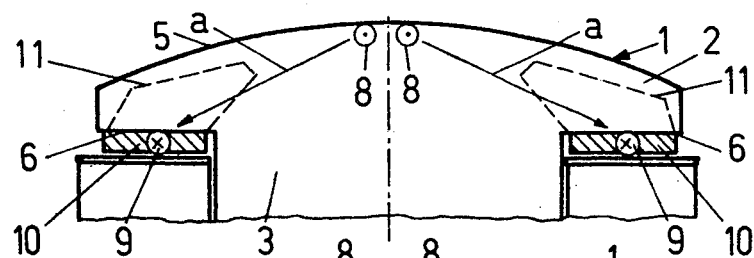
FIG. 3 is a front view of one solid pole, with conductor rods of rectangular profile placed below its pole shoe edges — the first species of the invention.
Figure 4:
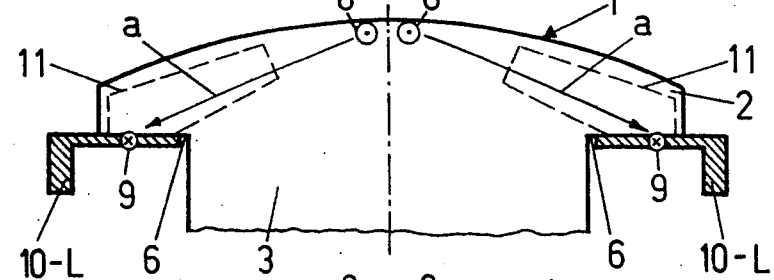
FIG. 4 shows a solid pole, similar to the view given in FIG. 3, with conductor rods of L-shaped profile — a second species of the invention.
Figure 5:
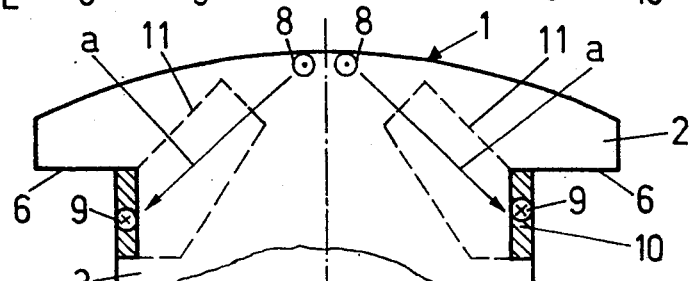
FIGS. 5, 6 and 7 show arrangements of the conductor rods at the sides of the pole shank — in accordance with a third, fourth and fifth species of the invention.
Figure 6:
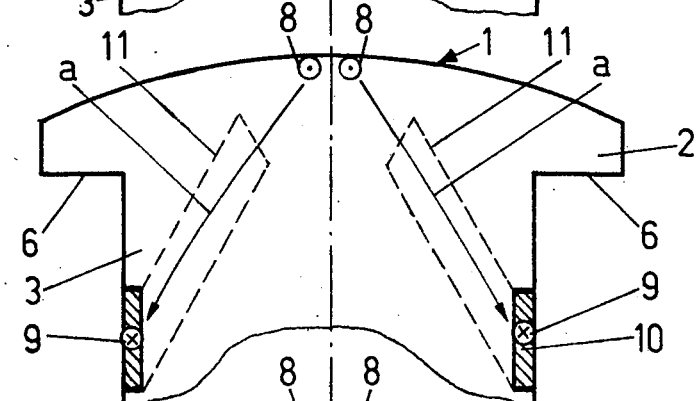
Figure 7:
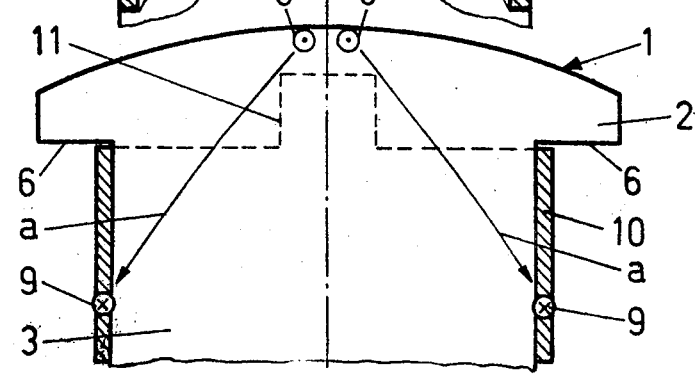

The various species shown by FIGS. 4, 5, 6 and 7 are substantially similar to the species depicted by FIG. 3, and identical components are denoted in these figures by identical reference numerals. In the case of the species shown by FIG. 4, the rods 10L have an L-shaped profile and are arranged below the pole shoe edges 6, while in case of the species shown by FIGS. 5, 6 and 7 the rods 10 have a rectangular profile and are placed at, and have a direct contact with the sides of the pole shank 3.

In the case of the species shown by FIGS. 8 and 9 the center of pole shoe 2 is provided with a deep groove 12 of rectangular, or circular profile respectively, extending in axial direction. It is also possible to provide several such grooves running parallel to each other. One or more rods 13 of good conductivity are placed inside the groove 12 and are electrically connected to the horizontal rods 10 arranged below the pole shoe edges 6. Thus, the horizontal rods 10 form first among each other a winding within the direct axis, as in the case of synchronous machines with anti-creeping devices arranged below the pole shoes, and secondly, together with the rods 13 in the pole center, form a winding within the quadrature-axis. The rods 13 are arranged in such manner that they are located within the pole center below the pole surface 5, with the result that the solid poles will maintain their suitable characteristics almost fully from standstill up to 80 to 90% of the rated speed. At higher speeds the windings 10, 13 will become effective due to the penetration by the resultant alternating field, and will increase substantially the asynchronous torque. The pole winding is indicated at 14.

The quadrature-winding proposed by the invention has the effect of symmetrizing electrically the two axes $d$ - $d$ and $q$ - $q$. It is for this reason that the quadrature-winding attains also a reduction in the oscillating torque.

FIG. 10 shows a circuit arrangement set up for starting-up run of a known synchronous motor 14 with solid poles without damper rings and without quadrature-winding. The torques illustrated in FIG. 11, were computed on the basis of this arrangement. The motor 14 is connected to an electrical network 15 with a network reactance X and a network voltage U. The network reactance X amounts to 2% of the rated impedance $Z_M$ of the motor, or $X = (2/100) \cdot Z_M$, and the network voltage U amounts to 100% of the rated voltage of the motor, i.e., $U = U_M$. In the field circuit 16 the field resistance is denoted by $r_f$ and the starting resistance by $\Delta r_f$. The computation of the torque was carried out for two cases, namely:

Case 1: $\Delta r_f = 9r_f$, and

Case 2: $\Delta r_f = 0$ (field circuit short-circuited).

The corresponding curves of the torque are shown in FIG. 11. In this figure (as well as in FIG. 13):

$m_a$ = asynchronous torque $m_p$ = oscillating torque $m_a + m_p$ = asynchronous torque + oscillating torque $m_a - m_p$ = asynchronous torque − oscillating torque The curves drawn in full lines related to Case 1, where the starting resistance $\Delta r_f$ within field circuit 16 amounts to the nine-fold value of the field resistance $r_f$, i.e. $\Delta r_f = 9r_f$.

The curves drawn in broken lines relate to Case 2, with the field circuit 16 being short-circuited, i.e., $\Delta r_f = 0$.

The circuit arrangement shown in FIG. 12 was set-up for the starting-up run of a synchronous motor 14A with solid poles without damper rings but with the quadrature-winding of the invention in accordance with the species of either FIGS. 8 or 9. The torques plotted in FIG. 13, were computed on the basis of this arrangement. The motor 14A is connected to an electrical network 16 with a network reactance X and a network voltage U, the values for X and U being identical with the values listed in connection with FIG. 10. The computation of the torque was carried out on the basis of Case 1, with $\Delta r_f = 9r_f$.

The curves of FIGS. 11 and 13 demonstrate clearly that in the case of a known synchronous motor the asynchronous torque will drop with an increase in speed, while in the case of the synchronous motor designed in accordance with the present invention this torque will rise gradually at in increase in speed. Furthermore, the oscillating torque of the motor designed in accordance with the invention will be only approximately one-half of the magnitude of the oscillating torque arising in the case of a known synchronous motor. It is therefore possible to attain, with starting-up conditions being identical, substantial improvements in the starting-up characteristics of a synchronous motor by means of the arrangement shown in FIGS. 8 or 9. No special computations were carried out for the species shown by FIGS. 3 to 7 but it will be obvious that these arrangements will likewise result in significant improvements in comparison with synchronous motor of known construction.

I claim:

1. A synchronous motor structure having a rotor component comprising a longitudinally extending central body portion, a plurality of solid poles extending outwardly from said body portion, each said pole including a shank terminating at its inner end in a claw connection by means of which said pole is secured to said central body portion and a pole shoe located at its outer end, conductor rods extending respectively in a longitudinal direction along opposite sides of said pole below said pole shoe from one end of the pole to the other and thence across opposite ends of the pole towards the center, said conductor rods together with the surface portion of said pole shoe forming single turn quadrature windings providing closed loop conductive paths confined to the pole for currents induced along the pole surface by the time-variable quadrature-field and which causes said currents to close around the quadrature-field, said quadrature windings also forming circuits parallel to the surfaces of said pole which thereby improves the asynchronous torque of the motor at low slip rates and reduces the oscillating torque.

2. A synchronous motor structure as defined in claim 1 wherein said conductor rods extending longitudinally along opposite sides of said pole below said pole shoe lie in direct contact with the under face of said pole shoe.

3. A synchronous motor structure as defined in claim 2 wherein said conductor rods have a rectangular profile.

4. A synchronous motor structure as defined in claim 2 wherein said conductor rods have an L-shaped profile.

5. A synchronous motor structure as defined in claim 1 wherein said conductor rods extending longitudinally along opposite sides of said pole below said pole shoe lie in direct contact with the sides of said shank.

6. A synchronous motor structure having a rotor component comprising a longitudinally extending central body portion, a plurality of solid poles extending outwardly from said body portion, each said pole including a shank terminating at its inner end in a claw connection by means of which said pole is secured to said central body portion and a pole shoe located at its outer end, side conductor rods extending respectively in a longitudinal direction along opposite sides of said pole below said pole shoe from one end of the pole to the other and thence across opposite ends of the pole towards the center, conductor rods means extending longitudinally of said pole and which are disposed in a longitudinally extending groove provided in the outer face of said pole shoe, said conductor rod means being connected to the opposite ends of said side conductor rods thus forming single turn quadrature windings providing closed loop conductive paths confined to the pole for currents induced along the pole surface by the time-variable quadrature-field and which causes said currents to close around the quadrature-field, said quadrature windings also forming circuits parallel to the surfaces of said pole which thereby improves the synchronous torque of the motor at low slip rates and reduces the oscillating torque.

7. A synchronous motor structure as defined in claim 6 wherein said longitudinally extending groove in the outer face of said pole shoe and said conductor rod means disposed therein have rectangular profiles.

8. A synchronous motor structure as defined in claim 6 wherein said longitudinally extending groove in the outer face of said pole and said conductor rod means disposed therein have circular profiles.

* * * * *